Nov. 5, 1957 G. R. SCHROEDER 2,812,399
TRACTOR IGNITION CUT-OFF DEVICE
Filed Feb. 1, 1956

George R. Schroeder
INVENTOR.

BY

United States Patent Office 2,812,399
Patented Nov. 5, 1957

2,812,399

TRACTOR IGNITION CUT-OFF DEVICE

George R. Schroeder, Beverly, Kans.

Application February 1, 1956, Serial No. 562,827

2 Claims. (Cl. 200—61.47)

The present invention relates to certain new and useful improvements in a mercury controlled circuit make and break device which is expressly designed and adapted for use in conjunction with an on-off switch such as is used on power operated farm machinery, for example, tractors.

An objective of the invention is to contribute to the on-off ignition system switch so that so long as the tractor is operating in a predetermined proper plane the switch remains constantly "on" but if and when the tractor topples over backwards or capsizes from side to side the mercury make and break device comes into play and renders the ignition switch temporarily ineffective and stops the engine.

Automatic safety-promotion and equivalent switches and cut-off appliances are not new. As a matter of fact, any number of varying safety switches are invoked and revealed in numerous prior patents. Such being the situation it is an obvious objective here to further contribute to this line of endeavor and, in doing so, to provide a simple, practical and reliable mercury controlled safety device which will fulfill the manufacturing and economy requirements of manufacturers, will be such that it may be endorsed by retailers, and will meet the safeguarding needs of farmers and others who operate tractors and the like.

Objects, features and advantages in addition to those evident from the preceding general information will become more specifically and readily apparent from the following description and the accompanying sheet of drawings.

Figure 1:
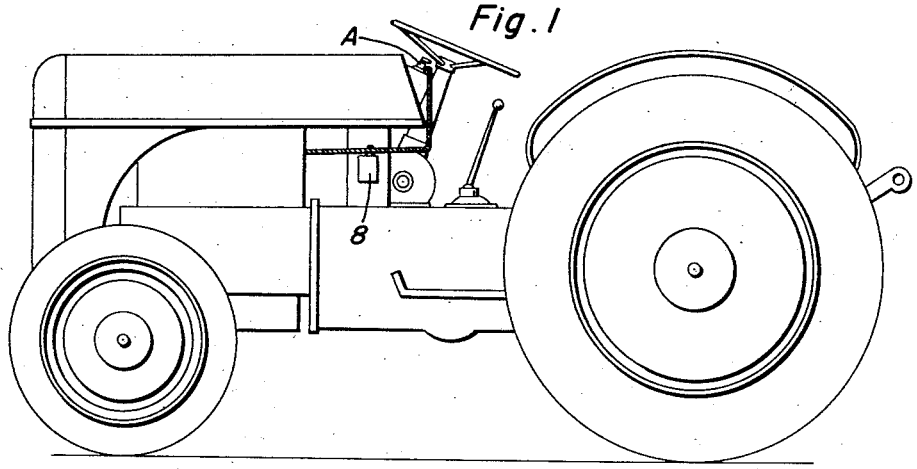
Figure 1 is a side elevation of a conventional-type tractor showing the ignition switch and the added accessory, that is, the tractor ignition cut-off device which is the subject matter of the instant invention.
Figure 3:
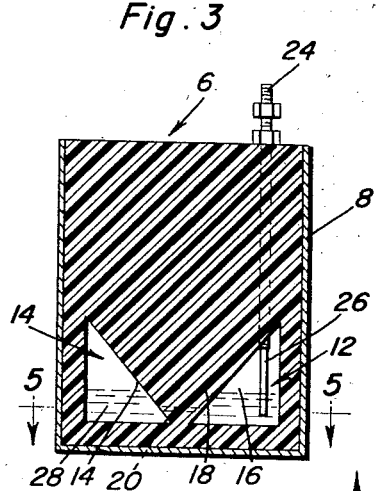
Figure 2:
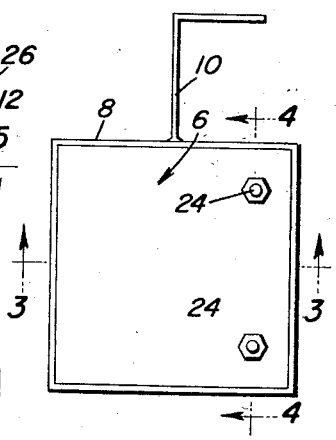
Figure 2 is a top plan view of the device by itself.
Figure 4:
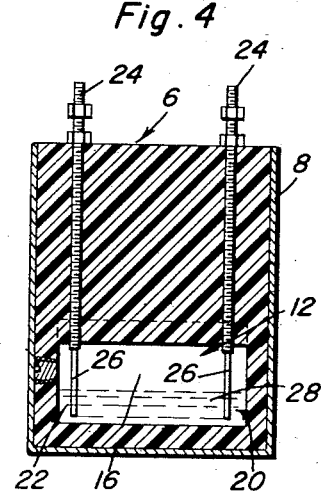
Figure 5:
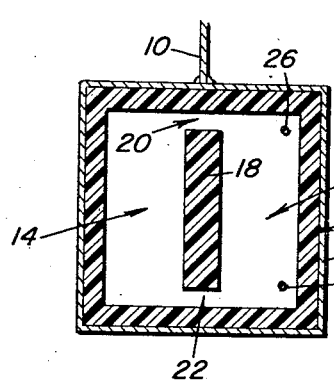

Figures 3 and 4 are sections at right angles to one another taken along the line 3—3 and 4—4, respectively, of Figure 2 looking in the direction of the indicating arrows; and Figure 5 is a horizontal section on the plane of the line 5—5 of Figure 3 also looking in the direction of the arrows.

The preferred embodiment of the invention is that illustrated which has to do with a glass or an equivalent transparent block-like body which is generally rectangular in cross-section and is denoted as an entity by the numeral 6. It is fitted and encased in a protective metal case or jacket 8. The latter is provided with an L-shaped or equivalent attaching bracket 10 whereby it may be attached to the instrument panel, steering post or some other convenient part. The block or body is so molded or made that it is characterized by two spaced parallel chambers one denoted by the numeral 12 and the other by the numeral 14 as perhaps best shown in Figs. 3 and 5. In cross section the chambers or compartments may be said to be generally triangular. The body portion of the block has inclined converging walls 14 and 16 and at the place of convergence which may be either the vertex or apex a divider or partition exists and this is conveniently denoted in Fig. 5 by the numeral 18 and the same is provided at what may be called its opposite end portions with restricted passages 20 and 22 which afford the means of communication between the two chambers 12 and 14. Embedded in the block are the spaced parallel vertically disposed electrodes 24 and these have their lower end portions 26 extending in spaced parallelism down into the chamber 12. There is sufficient mercury 28 provided to bring about the desired operation. Reviewed, therefore, it will be seen that the device has chambers connected by passages or channels 20 and 22 and these chambers contain enough mercury or other liquid capable of carrying an electric current, to fill one of the chambers when the device is in a position that the mercury has drained into one chamber leaving the other empty. The two electrodes extend into one of the chambers as pointed out and the upper ends are accessible so that the ignition wires going to the on-off switch may be attached thereto in an obvious manner. The lower ends 26 extend in the chamber 12 and communication is afforded between this chamber and chamber 14 by way of the end passages or ports 20 and 22.

In operation the device is mounted on the tractor in such a position that when the tractor is on level ground the mercury fills the chamber 12 completing the circuit to the on-off switch A in Fig. 2. Being connected rigidly to the tractor in this manner when the front of the tractor is elevated to a certain degree the mercury will flow into the space or chamber 14 thereby breaking the circuit and cutting off the power. When the front of the tractor is lowered to a safe level by its own weight the mercury will again return to the chamber 12 permitting the switch to be readied for continued tractor operation. The length of the electrodes extending into the mercury is sufficient to permit the tractor to be operated when it remains in the safe position. In a like manner if the tractor is tilted sideways to a dangerous degree or level the mercury will flow through one of the passages or ports 20 or 22 until one of the electrodes is no longer contacting the mercury and hence the power will cut off and the circuit will be broken.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety-type ignition cut-off device for a tractor or the like comprising a body jacketed in a case, rectangular in cross-section and having internal isolated but communicable chambers, said body being of insulation material, said case having a bracket adapted to be attached to a fixed support, a pair of electrodes embedded in said body and having their upper ends screw-threaded, equipped with clamping nuts and serving as binding posts, said upper ends being exposed above the top of the body and accessible for the attachment of current conducting wires thereto, the lower ends of the electrodes extending into but a single one of said chambers, and mercury contained in at least one of said chambers and shiftable from one chamber to the other under predetermined gravity controllable conditions, said chambers being separated by an intervening divider, being coplanar and disposed in spaced parallel relationship.

2. The structure defined in claim 1 and wherein said divider has two restricted passages, one at one end of the chambers and the other at the other end of the chambers, the lower end of one electrode being in general alignment with one passage and the corresponding lower end of the other electrode being in general alignment with the other passage.

References Cited in the file of this patent

UNITED STATES PATENTS 1,995,541     Hartzell _____ Mar. 26, 1935